United States Patent
Aoki et al.

(10) Patent No.: US 7,845,244 B2
(45) Date of Patent: Dec. 7, 2010

(54) TORQUE SENSOR

(75) Inventors: Kaname Aoki, Kashihara (JP); Taisuke Tsujimoto, Kashihara (JP)

(73) Assignee: JTEKT Corporation, Osaki-shi (JP)

( * ) Notice: Subject to any disclaimer, the term of this patent is extended or adjusted under 35 U.S.C. 154(b) by 0 days.

(21) Appl. No.: 12/235,880

(22) Filed: Sep. 23, 2008

(65) Prior Publication Data

US 2009/0078058 A1 Mar. 26, 2009

(30) Foreign Application Priority Data

Sep. 26, 2007 (JP) .............................. 2007-249774

(51) Int. Cl.
*G01L 3/04* (2006.01)
(52) U.S. Cl. ............................ 73/862.335; 73/862.331; 73/862.333
(58) Field of Classification Search ............. 73/862.335
See application file for complete search history.

(56) References Cited

U.S. PATENT DOCUMENTS

| | | | |
|---|---|---|---|
| 6,880,411 B2 * | 4/2005 | Nakane et al. | 73/862.331 |
| 7,047,824 B2 * | 5/2006 | Nakane et al. | 73/862.331 |
| 7,143,743 B2 * | 12/2006 | Uda et al. | 123/399 |
| 7,246,531 B2 * | 7/2007 | Nakane et al. | 73/862.332 |
| 7,568,400 B2 * | 8/2009 | Tokumoto et al. | 73/862.333 |
| 2002/0189371 A1 * | 12/2002 | Nakane et al. | 73/862.333 |
| 2002/0190709 A1 * | 12/2002 | Frederick et al. | 324/207.2 |
| 2003/0209087 A1 * | 11/2003 | Nakane et al. | 73/862.333 |
| 2004/0021459 A1 * | 2/2004 | Jones et al. | 324/207.25 |
| 2004/0263103 A1 * | 12/2004 | Weisser et al. | 318/439 |
| 2008/0028870 A1 * | 2/2008 | Tokumoto et al. | 73/862.333 |

FOREIGN PATENT DOCUMENTS

FR 2 689 633 A1 10/1993
JP 2003-149062 5/2003

OTHER PUBLICATIONS

European Search Report issued Jul. 2, 2010 in EP 08165128.3 filed Sep. 25, 2008.

* cited by examiner

*Primary Examiner*—Freddie Kirkland, III
(74) *Attorney, Agent, or Firm*—Oblon, Spivak, McClelland, Maier & Neustadt, L.L.P.

(57) ABSTRACT

A torque sensor includes a first shaft, a second shaft that is coaxially linked to the first shaft, a cylindrical magnet that rotates integrally with the first shaft, a pair of magnetic yokes that rotate integrally with the second shaft, and three magnetic sensors that respectively detect a change in magnetic flux of the magnetic yokes for calculating torque applied to the first and second shafts. Output characteristics of the three magnetic sensors are different from each other.

6 Claims, 6 Drawing Sheets

TORQUE SENSOR

BACKGROUND

The present invention relates to a torque sensor in; for instance, an electric power steering system, used for detecting steering torque applied to a steering member for steering purpose.

In an electric power steering system that drives a steering assist motor in accordance with turning operation of a steering member, such as a steering wheel, and that transmits rotary force of the motor to a steering mechanism, to thus assist steering operation, there is a necessity for detecting steering torque applied to the steering member for the purpose of being used for controlling driving of the steering assist motor. For the detection, a torque sensor that is disposed at any position on a steering shaft and that establishes mutual communication between the steering member and a steering mechanism has been used.

The torque sensor is configured that the steering shaft, which is to serve as an object of detection, is divided into first and second shafts coaxially linked by a torsion bar which serves as a torsion spring and which has a small diameter; such that relative angular displacement arises between the first and second shafts in conjunction with a twist of the torsion bar when steering torque is applied to the steering shaft by rotating operation of the steering member; and such that the steering torque is detected by taking the relative angular displacement as a medium.

The relative angular displacement between the first and second shafts has been detected by various related devices. JP-A-2003-149062 discloses a torque sensor that utilizes changes in a magnetic circuit provided existing between a cylindrical magnet and a pair of magnetic yokes. The cylindrical magnet rotates integrally with a first shaft. The magnetic yokes rotate integrally with a second shaft.

The magnetic yokes that rotate integrally with the second shaft correspond to rings made of a soft magnetic substance. The rings have a plurality of pole claws which extend in an axial direction toward one side of an annular yoke main body. The pole claws of each ring are spaced at an equal distance along a circumferential direction. The respective pole claws are alternately positioned in the circumferential direction, such that the respective rings are arranged in an axially-longitudinal direction and fixed to the second shaft. Further, the cylindrical magnet that rotates integrally with the first shaft is a multipole magnet having pairs of magnetic poles which are equal in number to the pole claws of the magnetic yokes and which are arranged side by side along the circumferential direction. The cylindrical magnet is fixed to the first shaft while phase adjustment is achieved along the circumferential direction in such a way that the pole claws of the magnetic yokes conform with borders among the north and south poles in a neutral state where relative angular displacement does not arise in the first and second shafts.

Magnetism collection rings made of a soft magnetic substance are disposed outside the two magnetic yokes so as to be in close proximity and opposite respective yoke main bodies. These magnetism collection rings have magnetism collection sections that are arranged in a line and that oppose each other with a predetermined air gap therebetween. Magnetic sensors using magnetic sensing elements, such as Hall elements, are arranged in the respective air gaps among the magnetism collection sections.

By the foregoing configuration, when relative angular displacement arises between the first and second shafts, phase differences of opposite directions develop between the pole claws of the two magnetic yokes and the magnetic poles of the cylindrical magnet. By changes in magnetic flux in the respective different magnetic yokes responsive to the phase difference, the magnetic fluxes leaking to the air gaps among the magnetism collection sections of the respective magnetism collection rings increase or decrease. The relative angular displacement developing between the first and second shafts can be detected by extracting the changes in the output from the magnetic sensor conforming to such an increase or decrease, and torque (steering torque) applied to the first and second shafts can be determined.

When the torque sensor configured as mentioned above is applied to an electric power steering system, countermeasures against a failure are indispensable for eliminating the potential of steering assistance becoming unstable as a result of erroneous detection of the steering torque.

In the torque sensor described in the prior art, two magnetic sensors are arranged along the circumference of the magnetism collection ring, and determination of a failure in each of the magnetic sensors is consecutively performed by comparing outputs from the sensors. Even when one of the magnetic sensors is determined to be failed, it is still possible to detect torque by an output from the other magnetic sensor, thereby enabling continuation of a steering assist. There has also been proposed a torque sensor having three magnetic sensors, wherein outputs from the sensors are compared with each other, to thus facilitate location of a failed magnetic sensor based on majority rule.

However, determination of a failure, such as that mentioned above, is performed by taking a failure or anomaly in each of the magnetic sensors as an object of detection. In contrast, a failed state where a normal torque detection value is not acquired is also induced by a shortcircuit in signal lines of the respective magnetic sensors. In this case, it is difficult to make a determination by comparing outputs to each other. When the torque sensor is used as a device for detecting steering torque in an electric power steering system, an erroneous steering assist will be performed on the basis of a torque detection value acquired with the signal lines being short-circuited, which raises a problem of the driver feeling a sense of discomfort.

SUMMARY

The present invention has been conceived in view of the circumstance and aims at providing a torque sensor that can also effectively determine a failed state attributable to a short-circuit in signal lines of magnetic sensors and that can eliminate an erroneous torque detection value acquired in a short-circuited state.

In order to achieve the above object, according to the present invention, there is provided a torque sensor, comprising:

a first shaft;

a second shaft that is coaxially linked to the first shaft;

a cylindrical magnet that rotates integrally with the first shaft;

a pair of magnetic yokes that rotate integrally with the second shaft; and three magnetic sensors that respectively detect a change in magnetic flux of the magnetic yokes for calculating torque applied to the first and second shafts, wherein output characteristics of the three magnetic sensors are different from each other.

Preferably, differences in the output characteristics correspond to output gains or offsets of the three magnetic sensors, respectively.

Preferably, the three magnetic sensors have power lines and ground lines respectively; and wherein the power lines are separated independently, and the ground lines are separated independently.

Preferably, the three magnetic sensors have a common power line and a common ground line.

The torque sensor of the present invention has three magnetic sensors that differ from each other in terms of output characteristics, such as a gain and an offset. Hereby, occurrence of a short circuit in signal lines of any two of the magnetic sensors can be determined by a comparison between outputs from these magnetic sensors and an output from a remaining magnetic sensor. An erroneous torque detection value acquired in a short-circuited state can be eliminated.

Further, the power lines and the ground lines of the three magnetic sensors are separated independently from each other. Hence, there can be eliminated the potential of outputs from the three magnetic sensors simultaneously falling for reasons of a short circuit in the power lines or the ground lines and, hereby, a normal torque detection value being not acquired. For example, in a case where the torque sensor is used for detecting steering torque in an electric power steering system, life-support control for continuing a steering assist by use of an output from any of the magnetic sensors can be carried out in the case of occurrence of a short circuit in the sections as well as in the case of occurrence of failures in the respective magnetic sensors. Thus, the present invention yields a superior advantage.

BRIEF DESCRIPTION OF THE DRAWINGS

The above objects and advantages of the present invention will become more apparent by describing in detail exemplary embodiments thereof with reference to the accompanying drawings, wherein.

DETAILED DESCRIPTION OF EXEMPLARY EMBODIMENTS

Figure 1:
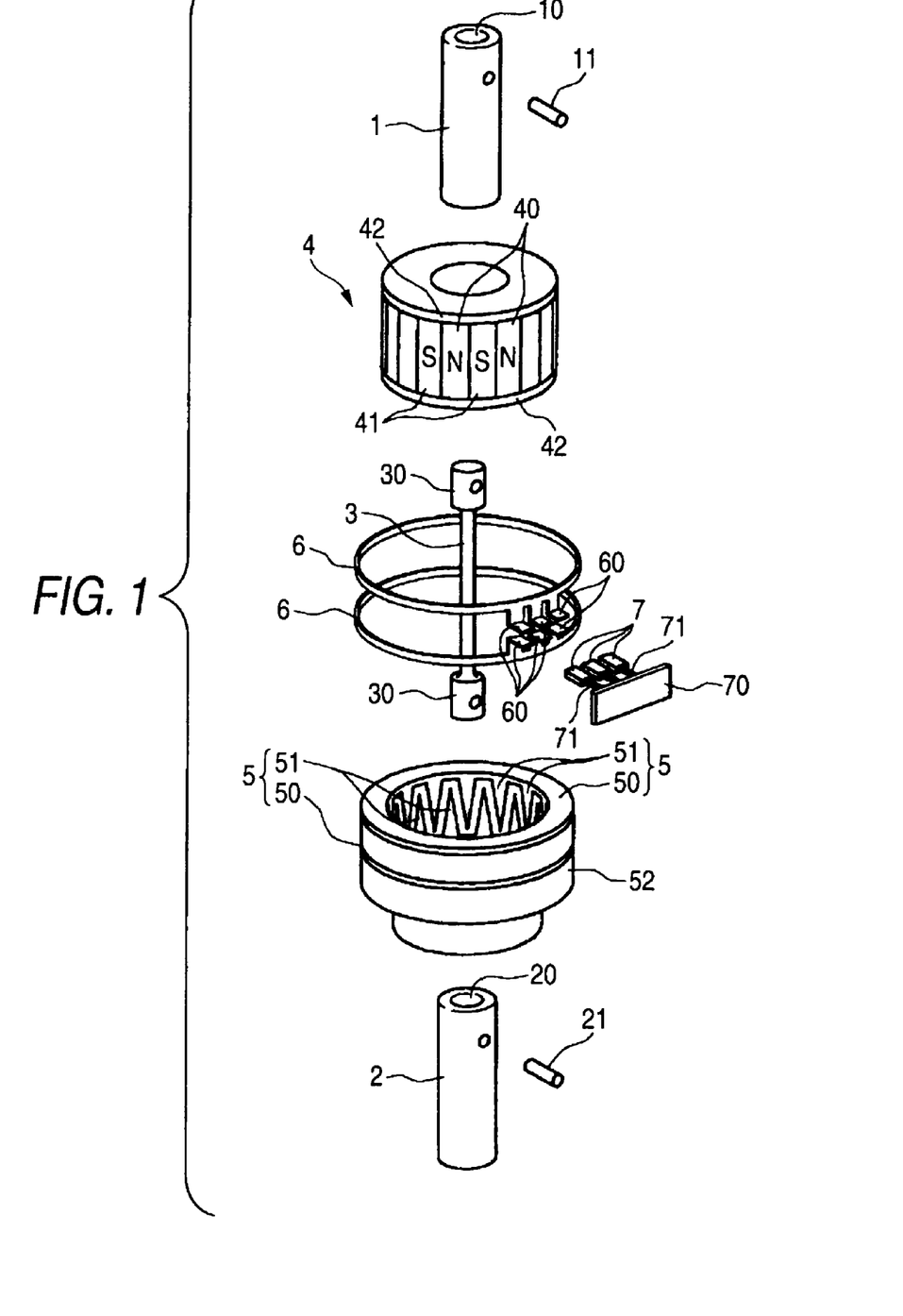
FIG. 1 is an exploded perspective view of a torque sensor of the present invention.
Figure 2:
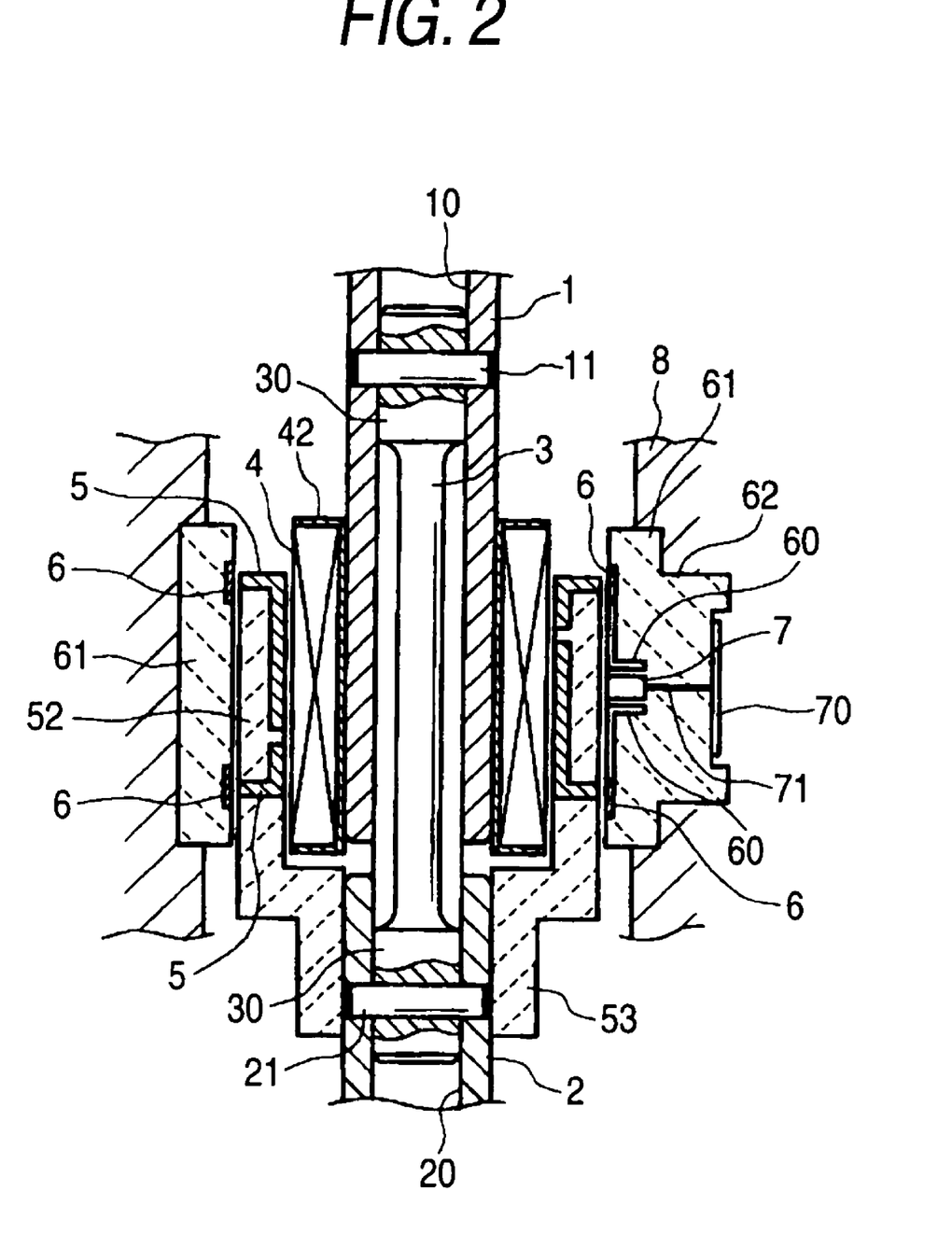
FIG. 2 is a longitudinal cross-sectional view showing an assembled state of the torque sensor of the present invention.

The present invention will be described in detail hereunder by reference to the drawings that represent an embodiment of the invention. FIG. 1 is an exploded perspective view of a torque sensor of the present invention, and FIG. 2 is a longitudinal cross-sectional view showing an assembled state of the torque sensor.

The torque sensor of the present invention takes, as an object of detection, torque applied to two shafts (a first shaft 1 and a second shaft 2) coaxially linked to each other by way of a torsion bar 3; and has a cylindrical magnet 4 that rotates integrally with the first shaft 1 and a pair of magnetic yokes 5, 5 that rotate integrally with the second shaft 2.

The torsion bar 3 is a round bar that acts as a torsion spring and that has a small diameter. Joints 30, 30, which are provided on both sides of the torsion bar 3 and which have a large diameter, are fit into a joint hole 10 formed in a shaft center of the first shaft 1 and a joint hole 20 formed in a shaft center of the second shaft 2, respectively, thereby positioning the torsion bar in a circumferential direction as will be described later. Subsequently, a joint pin 11 and a joint pin 21, which are separated from each other, are driven into the torsion bar, whereby the torsion bar and the first and second shafts 1, 2 are integrally joined together. When running torque is applied to the first shaft 1 and the second shaft 2 that are joined together as mentioned above, the torsion bar 3 is torsionally deformed by action of the running torque, whereupon relative angular displacement responsive to the magnitude of the running torque develops between the first shaft 1 and the second shaft 2 in the direction of the thus-applied running torque.

As shown in FIG. 1, the cylindrical magnet 4 that rotates integrally with the first shaft 1 is formed as a cylindrical multipole magnet. In the magnet, a plurality of north poles 40, 40, . . . and a plurality of south poles 41, 41, . . . are aligned along a circumference; and end faces and an interior surface of the magnet are covered with hold members 42, each of which is made of a resin to an appropriate thickness. As shown in FIG. 2, the cylindrical magnet 4 is externally, fixedly fitted around the first shaft 1 by way of the holding members 42.

The magnetic yokes 5, 5 that rotate integrally with the second shaft 2 correspond to rings made of a soft magnetic substance, as shown in FIG. 1. In the yokes, a plurality of pole claws 51, 51, . . . extending in an axial direction are arranged along the circumferential direction at equal spaces on interior surfaces of respective annular yoke main bodies 50. Each of the pole claws 51, 51, . . . has a triangular shape whose width is reduced to its extended end. The two magnetic yokes 5, 5 are coaxially positioned while pointed sides of the respective pole claws 51, 51, . . . oppose each other and are alternately positioned along the circumferential direction. The magnetic yokes are integrally held by a cylindrically-molded hold cylinder 52 made of a resin.

The thus-constructed magnetic yokes 5, 5 are fastened to a shaft end of the second shaft 2 while an extended portion on one side of the hold cylinder 52 is fitted around the shaft end of the second shaft. As shown in FIG. 2, the pole claws 51, 51, . . . exposed on the inside of the hold cylinder 52 oppose an exterior circumferential surface of the cylindrical magnet 4 fixedly fitted around the first shaft 1 with a nominal air gap sandwiched therebetween. Thus, the magnetic yokes and the cylindrical magnet 4 are assembled while a circumferential positional relationship provided below is maintained.

Figure 3A:
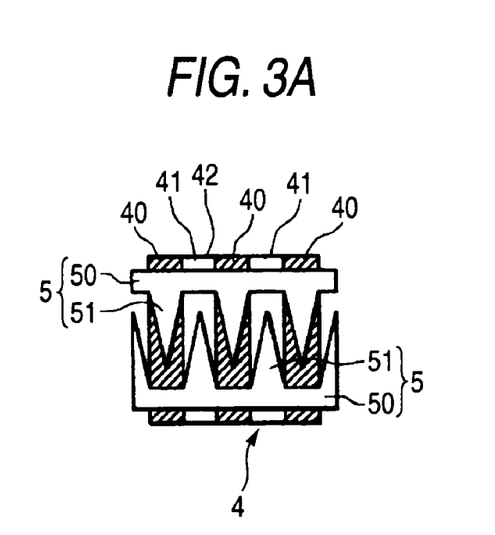
FIGS. 3A to 3C are explanatory views showing a positional relationship between magnetic yokes and a cylindrical magnet achieved in a circumferential direction.
Figures 3B, 3C:
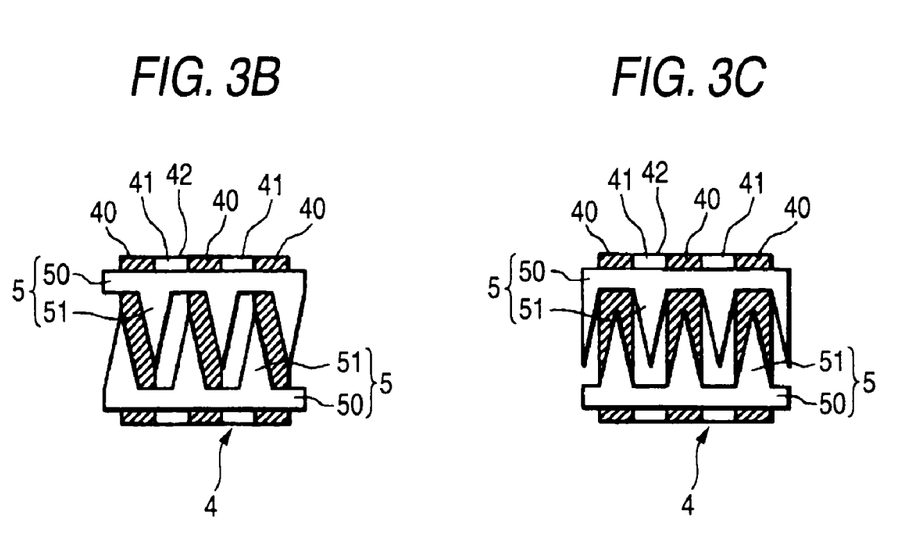

FIGS. 3A to 3C are explanatory views showing a circumferential positional relationship between the magnetic yokes 5, 5 and the cylindrical magnet 4. FIG. 3B shows an positional relationship achieved during assembly. The magnetic yokes 5,5 and the cylindrical magnet 4 are assembled while phase adjustment is achieved in the circumferential direction in such a way that the respective pole claws 51, 51, . . . of the magnetic yokes 5, 5 sequentially come into agreement with respective borders among the north poles 40 and the south poles 41 arranged along the circumference of the cylindrical magnet 4. Phase adjustment is implemented by adjusting the circumferential positions of the cylindrical magnet 4 and the magnetic yokes 5, 5 along with the shafts 1, 2 when the first shaft 1 and the second shaft 2 are joined to the torsion bar 3.

By such assemblage, the respective pole claws 51, 51 . . . of the two magnetic yokes 5, 5 are situated, under the same conditions, in a magnetic field generated between the north poles 40 and the south poles 41 that adjoin to each other along the circumference of the cylindrical magnet 4, and magnetic fluxes developing in the yoke main bodies 50, 50 that establish communication between bases of the pole claws 51, 51 ... become identical.

When relative angular displacement occurs along with a twist of the torsion bar 3 between the first shaft 1 to which the cylindrical magnet 4 is fastened and the second shaft 2 to which the magnetic yokes 5,5 are fastened, phases of the pole claws 51, 51 ... of the respective magnetic yokes 5, 5 and phases of the north poles 40 and the south poles 41 of the cylindrical magnet 4 change in mutually-opposite directions as shown in FIG. 3A or 3C. When the phase changes occur, lines of magnetic force exhibiting mutually-opposite polarities increase in the pole claws 51, 51 ... of one magnetic yoke 5 and the pole claws 51, 51 ... of the other magnetic yoke 5, whereupon positive and negative magnetic fluxes develop in the respective yoke main bodies 50, 50. Positive polarity and negative polarity of the magnetic fluxes arising at that time are determined in accordance with the orientation of relative angular displacement developing between the cylindrical magnet 4 and the magnetic yokes 5, 5; namely, between the first shaft 1 and the second shaft 2. Densities of the positive and negative magnetic fluxes correspond to the magnitude of relative angular displacement.

Two magnetism collection rings 6, 6 are disposed outside of the magnetic yokes 5, 5. These magnetism collection rings 6, 6 correspond to rings that are made of a soft magnetic substance and that have inner diameters slightly larger than outer diameters of the yoke main bodies 50, 50. As shown in FIG. 1, magnetism collection projections (magnetism collection sections) 60, 60, and 60 that extend in the axially longitudinal direction and have leading ends bent outwardly in a radial direction are provided at three locations, which are separated from each other at given spaces in the circumferential direction, on each of the magnetism collection rings 6, 6. The two magnetism collection rings 6, 6 are coaxially arranged while respective extended sides of their magnetism collection projections 60, 60, and 60 oppose each other; and are positioned in such a way that bent portions of the leading ends of the respective magnetism collection projections 60, 60, and 60 oppose each other with a predetermined air gap therebetween. The magnetism collection rings are integrally held in a hold cylinder 61 made of a resin, as shown in FIG. 2.

The thus-configured two magnetism collection rings 6, 6 are assembled in such a way that the hold cylinder 61 is fitted into the housing 8, which is partially shown in FIG. 2, and that inner circumferential surfaces of the respective magnetism collection rings 6, 6 closely oppose outer circumferential surfaces of the yoke main bodies 50,50 of the respective, separate magnetic yokes 5, 5. By the assemblage, magnetic fluxes developing in the yoke main bodies 50, 50 that are respectively located inside of the two magnetism collection rings 6, 6, are induced. The magnetic fluxes converge on the leading ends of the respective, separate magnetism collection projections 60, 60, and 60, to thus leak to the air gap existing between the projections.

The magnetic sensors 7, 7, and 7 using magnetic sensing elements, such as Hall elements, are respectively interposed between the pair of magnetism collection rings 6, 6 at the three magnetism collection projections 60, 60, and 60 thereof. The magnetic sensors 7, 7, and 7 are connected, by way of respectively separate leads 71, 71, ..., to a common circuit board 70 having peripheral circuits, such as a power circuit and a signal processing circuit. As shown in FIG. 2, the circuit board 70 is supported while facing outside by a support section 62 outwardly provided in a projecting manner on a part of an outer circumference of the hold cylinder 61. The magnetic sensors 7, 7, and 7 are supported on the circuit board 70 by the respective separate leads 71, 71, ...; are positioned within the air gap ensured between the corresponding magnetism collection projections 60, 60; and are arranged so as to produce outputs responsive to densities of respective magnetic fluxes leaking to the air gap.

The outputs from the magnetic sensors 7, 7, and 7 are changed by the magnetic fluxes developing in the yoke main bodies 50, 50 opposing the magnetism collection rings 6, 6. The thus-developed magnetic fluxes correspond to respective relative angular displacements relative to the cylindrical magnet 4; namely, relative angular displacements arising between the first shaft 1 and the second shaft 2, and also correspond to the direction and magnitude of the running torque that induces the relative angular displacements, as mentioned above. Consequently, the running torque applied to the first shaft 1 and the second shaft 2 can be detected on the basis of changes in the outputs from the magnetic sensors 7, 7, and 7.

Figure 4:
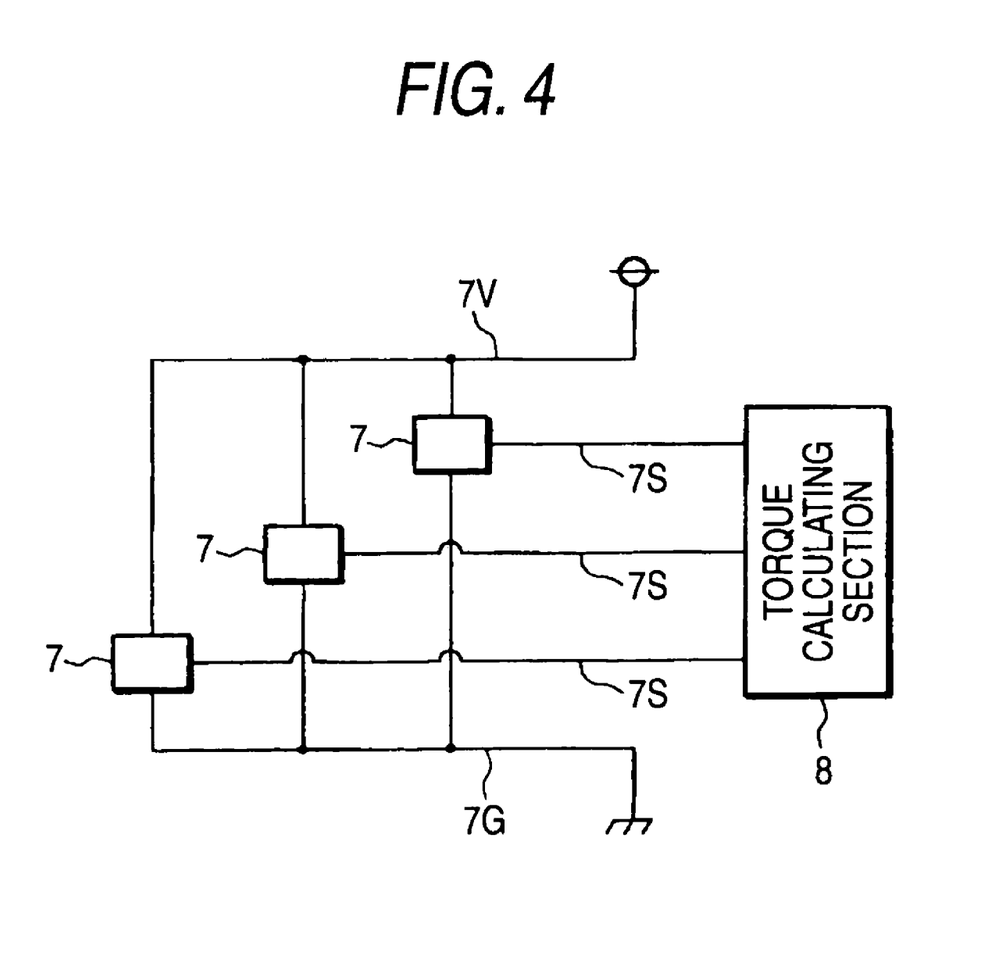
FIG. 4 is a wiring diagram of magnetic sensors.

FIG. 4 is a wiring diagram of the magnetic sensors 7, 7, and 7. As mentioned above, the three magnetic sensors 7, 7, and 7 using Hall elements have a common power line 7V, a common ground line 7G, and respective separate signal lines 7S, 7S, and 7S. The three magnetic sensors 7, 7, and 7 are configured so as to supply the outputs, which are generated by a power supply from the power line 7V and the ground line 7G, to a torque calculating section 8 by way of the respective separate signal lines 7S, 7S, and 7S.

Figure 5A:
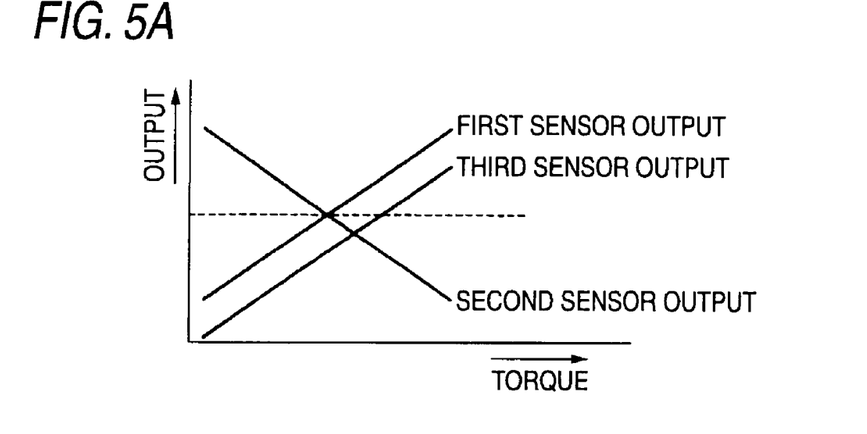
FIGS. 5A to 5C are views showing example output characteristics of the magnetic sensors.
Figure 5B:
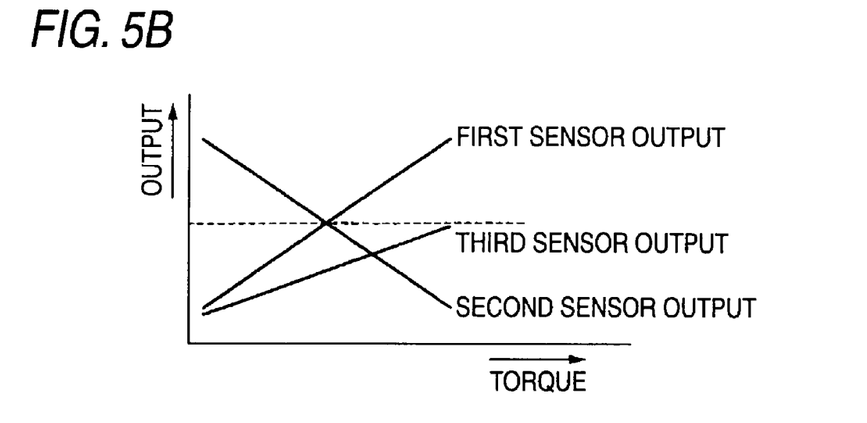
Figure 5C:
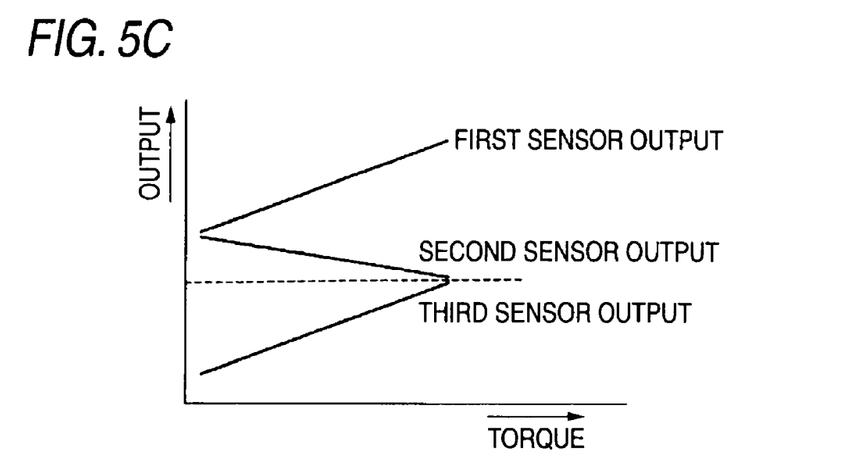

The three magnetic sensors 7, 7, and 7 in the torque sensor of the present invention have mutually-different output characteristics. FIGS. 5A to 5C are views showing example output characteristics of the magnetic sensors 7, 7, and 7. In the drawing, a horizontal axis represents torque, and a vertical axis represents outputs from the respective magnetic sensors 7, 7, and 7.

In FIG. 5A, outputs from the two magnetic sensors 7, 7 (a first sensor output and a second sensor output) cross each other at the center (a neutral point) within a torque detection range. Gains are set on both sides of the neutral point so as to change in opposite directions in response to changes in torque. An output (a third sensor output) from the remaining one magnetic sensor 7 has a gain essentially equal to the first sensor output and exhibits an output characteristic offset so as not to overlap the first sensor output and the second sensor output.

In FIG. 5B, the first and second sensor outputs are set as in FIG. 5A, and the third sensor output has a gain, which is different from the gain of the first sensor output but is oriented in the same direction, and is also set so as to impart an appropriate amount of offset. In FIG. 5C, the first to third sensor outputs are set so as to avoid occurrence of an overlap over the entire torque detection range by appropriately changing gains and offsets as appropriate.

The torque calculating section 8 acquires the outputs from the three magnetic sensors 7, 7, and 7 through the respective separate signal lines 7S, 7S, and 7S and calculates torque exerted on the first shaft 1 and the second shaft 2 by use of these outputs (the first to third sensor outputs). The computing procedures are described in connection with the case where output characteristics shown in FIG. 5A are set.

The torque calculating section 8 calculates torque by use of the respective first to third sensor outputs and compares computation results with each other. Computation of torque can be performed by application of a map, such as that shown in FIG. 5A.

In this case, the third sensor output is used for determining whether or not the first and second sensor outputs are failed. When a result of foregoing comparison shows presence of a predetermined significant difference between torque calculated from either the first sensor output or the second sensor output and the torque calculated from the third sensor output, the torque calculating section 8 determines that a corresponding first sensor output or a corresponding second sensor output is anomalous. The magnetic sensor 7 for acquiring the third sensor output for failure determination purpose does not require the same degree of reliability as that of the other two magnetic sensors 7, 7, and hence an inexpensive sensor can be used.

When both the first and second sensor outputs are normal, the torque calculating section 8 determines a difference between the first and second sensor outputs, and computing normal torque from the difference. As shown in FIG. 5A, the first and second sensor outputs have gains of opposite directions, and a difference between these sensor outputs exhibits a great rate of change with respect to a torque change. Hence, the accuracy of computation of torque can be enhanced. As a result of the difference between the first and second sensor outputs being determined, noise components superimposed on the respective first and second sensor outputs cancel each other, and the accuracy of computation of torque can be enhanced further by elimination of the influence of noise.

When either the first sensor output or the second sensor output is anomalous, the torque calculating section 8 calculates torque by use of only the normal first sensor output or the normal second sensor output. The thus-acquired torque computation value is used as a torque value in an anomalous state. For instance, in a case where the torque sensor is used for detecting steering torque in an electric power steering system, the sensor value is used for controlling emergency steering operation intended for moving a vehicle to a safe location (life-support control). In this case, it is desirable to report occurrence of an anomaly in the driver by reporting means, such as generation of an alarm and an appropriate display.

Anomalies in the first and second sensor outputs are also induced by a short circuit among the signal lines 7S, 7S, and 7S of the magnetic sensors 7, 7, and 7. The torque calculating section 8 can determine occurrence of an anomaly attributable to a short circuit as follows by comparing the first to third sensor outputs to each other.

As mentioned above, the third sensor output has the output characteristic that does not overlap the output characteristics of the first and second sensor outputs. Therefore, when a result of comparison of the first to third sensor outputs shows presence of a coincidence between the first sensor output or the second sensor output and the third sensor output, the first sensor output or the second sensor output, which shows the coincidence, can be determined to be anomalous for reasons of a short circuit.

Meanwhile, the coincidence between the first sensor output and the second sensor output also occurs even in the neutral point as mentioned above. Hence, a short circuit arising between the first sensor output and the second sensor output cannot be determined by only the coincidence. However, the direction of a change in the first sensor output and the second sensor output, which will arise subsequently, and the direction of a change in the remaining third sensor output are monitored. When a match exists between both directions, the second sensor output whose gain is set in the opposite direction can be determined to be anomalous. When the directions differ from each other, the first sensor output whose gain is set in the same direction can be determined to be anomalous. The determination can also be performed in the same fashion even when the output characteristics shown in FIG. 5B or 5C are set.

When a determination about such an anomaly attributable to a short circuit is made, the torque calculating section 8 calculates torque by use of only the normal first sensor output or the normal second sensor output as in the case of occurrence of an anomaly in the magnetic sensors 7, 7, and 7. The thus-acquired torque computation value is used as a torque value in an anomalous state. For instance, in a case where the torque sensor is used for detecting steering torque in an electric power steering system, the sensor value is used for controlling emergency steering operation intended for moving a vehicle to a safe location (life-support control).

The torque calculating section 8 can discriminate between occurrence of a failure attributable to a short circuit in the signal lines 7S, 7S, and 7S determined as mentioned above and occurrence of an anomaly in the magnetic sensors 7, 7, and 7. Hence, countermeasures to be taken after occurrence of an anomaly can be immediately carried out.

Figure 6:
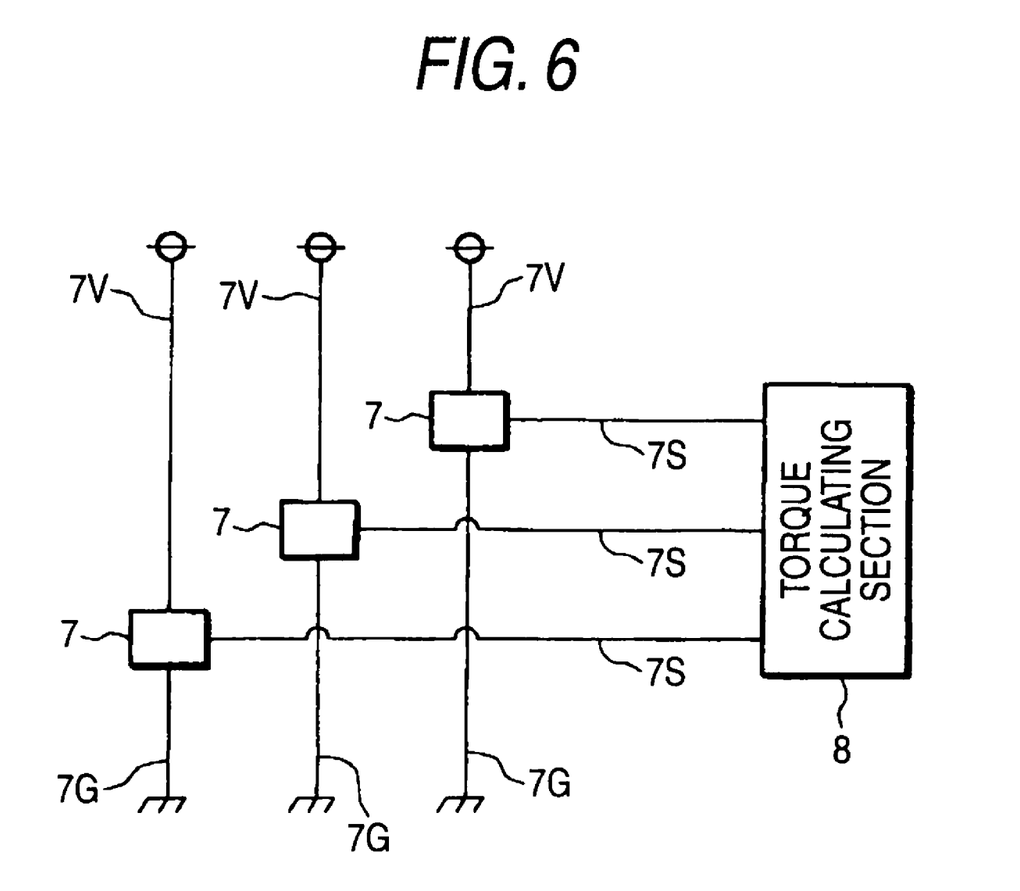
FIG. 6 is a wiring diagram of magnetic sensors of another embodiment of the present invention.

FIG. 6 is a wiring diagram of magnetic sensors of another embodiment of the present invention. In the drawing, three magnetic sensors 7, 7, and 7 have separate power lines 7V, 7V, and 7V and separate ground lines 7G, 7G, and 7G, respectively, and are configured such that outputs generated by the respective magnetic sensors 7, 7, and 7 by power supplies from these power lines 7V, 7V, and 7V and the ground lines 7G, 7G, and 7G are imparted to the torque calculating section 8 by way of respective separate signal lines 7S, 7S, and 7S.

In the present embodiment, there is no risk of the power lines 7V, 7V, and 7V or the ground lines 7G, 7G, and 7G of the magnetic sensors 7, 7, and 7 being simultaneously short-circuited and, hereby, all of the outputs from the three magnetic sensors 7, 7, and 7 falling. An anomaly ascribable to a short circuit in the power lines 7V, 7V, and 7V or the ground lines 7G, 7G, and 7G can be determined by comparing the outputs to each other as in the case of occurrence of an anomaly in the magnetic sensors 7, 7, and 7. An anomalous output from the magnetic sensor 7 whose power line 7V or ground line 7G is short-circuited can be eliminated, or torque can be calculated by use of normal outputs from the remaining magnetic sensors 7, 7.

The thus-acquired torque computation value is also used as a torque value in an anomalous state. For instance, in a case where the torque sensor is used for detecting steering torque in an electric power steering system, the sensor value is used for controlling emergency steering operation intended for moving a vehicle to a safe location (life-support control). In this case, it is desirable to report occurrence of an anomaly in the driver by reporting means, such as generation of an alarm and an appropriate display.

Even in the present embodiment, occurrence of an anomaly ascribable to a failure in the respective magnetic sensors 7, 7, and 7 or a short circuit in the respective signal lines 7S, 7S, and 7S can be determined Hence, all failure events, including a short circuit among the power lines 7V, 7V, and 7V or among the ground lines 7G, 7G, and 7G, can be addressed.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-249774 filed on Sep. 26, 2007, the contents of which are incorporated herein for reference.

What is claimed is:

1. A torque sensor, comprising:
a first shaft;
a second shaft that is coaxially linked to the first shaft;

a cylindrical magnet that rotates integrally with the first shaft;

a pair of magnetic yokes that rotate integrally with the second shaft; and three magnetic sensors that respectively detect a change in magnetic flux of the magnetic yokes for calculating torque applied to the first and second shafts, wherein the three magnetic sensors are configured such that output characteristics of the three magnetic sensors are different from each other.

2. The torque sensor according to claim 1, wherein differences in the output characteristics correspond to output gains or offsets of the three magnetic sensors, respectively.

3. The torque sensor according to claim 1, wherein the three magnetic sensors have power lines and ground lines respectively; and wherein the power lines are separated independently, and the ground lines are separated independently.

4. The torque sensor according to claim 1, wherein the three magnetic sensors have a common power line and a common ground line.

5. The torque sensor according to claim 1, wherein the output of one of said three sensors exhibits a slope that increases with an increase in the torque applied to the first and second shafts, and the output of another of said three sensors exhibits a slope that decreases with an increase in the torque applied to the first and second shafts.

6. The torque sensor according to claim 5, wherein the output of a third of the sensors does not overlap the output of the one and another of said sensors.

* * * * *